F. Parkerson.
Wheel-Barrow.

No 76241 — Patented Mar. 31, 1868.

Witnesses.
Charles H. Evans.
Isaac R. Oakford.

Inventor.
Francis Parkerson

United States Patent Office.

FRANCIS PARKERSON, OF PHILADELPHIA, PENNSYLVANIA.

Letters Patent No. 76,241, dated March 31, 1868.

IMPROVED WHEEL-BARROW.

*The Schedule referred to in these Letters Patent and making part of the same.*

TO ALL WHOM IT MAY CONCERN:

Be it known that I, FRANCIS PARKERSON, of the city of Philadelphia, county of Philadelphia, and State of Pennsylvania, have invented a new and useful Improvement in Wheel-Barrows; and I do hereby declare that the following is a full, clear, and exact description of the construction and operation of the same, reference being had to the accompanying drawings, making a part of this specification, in which—

The nature of my invention consists in providing an adjustable wheel-barrow, or one that can be made large or small at pleasure, simply by means of the jointed axle and bottom boards, arranged and operating as hereinafter described.

To enable others skilled in the art to make and use my invention, I will now proceed to describe its construction and operation.

The axle A is made of iron or steel, and in five parts, the whole forming knuckle or hinged joint. The bottom or platform which rests on the axle A is made with three divisions, B B, B B', and B B''; B B and B B' being stationary, and secured to the axle A by means of bolts and nuts 1, 2, 3, and 4. On the under part of B B and B B', and secured by screws or otherwise, are four metallic plates, P, P', P'', and P''', said plates extending a short distance over on board B B'', and through which pass four loose bolts, L, L', L'', and L'''. In the centre of B B'', and at a sufficient distance apart for the axle to set in, are screwed two metallic plates, M and M', for the purpose of preventing the shifting of the board B B'' when set in place. The wheels on axle A are made of malleable or cast iron, of any form desired. The side and end-boards are held in proper position by means of plates and pins of ordinary construction, and made so as to remove at pleasure.

Figure 1:
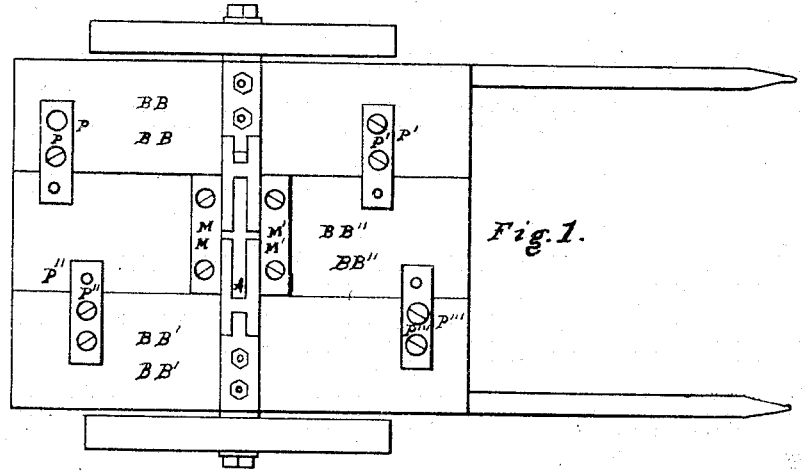
Figure 1 is a bottom plan view of my wheel-barrow.
Figure 2:
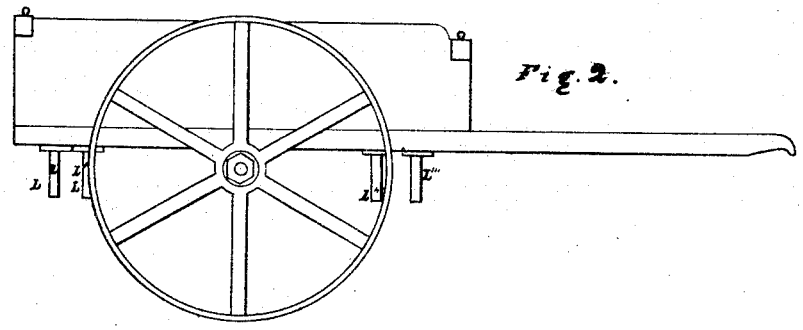
Figure 2 is a side view of same.
Figure 3:
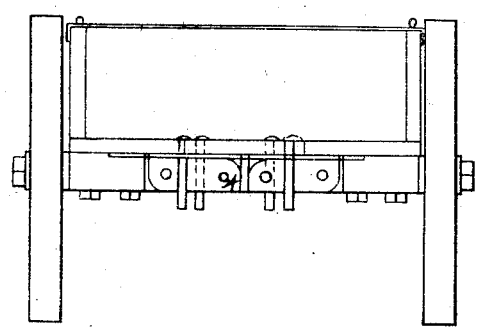
Figures 3 and 4 are end views of same, showing it contracted and extended.
Figure 4:
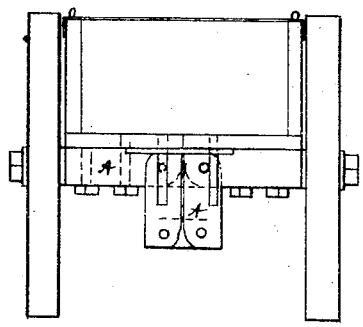
Figure 5:
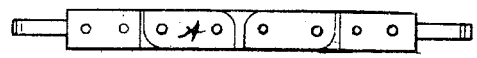
Figures 5 and 6 are views of axle.
Figure 6:

Fig. 1 shows the barrow extended to its full width. Now, when it is desired to contract it or make it narrower, the side and end-boards are first removed. I now draw out bolts L, L', L'', and L''', and lift out bottom-board B B''. The wheels are now drawn together, and the axle, doubling up, draws the bottom-boards B B and B B' together, and laps over plates P, P', P'', and P'''. I now insert bolts L' and L'' in plates P' and P'', after which place in proper position the side and end-boards, (an extra set of end-boards being necessary, owing to the narrowing.) The barrow now takes the form as shown in fig. 4. When it is desired, the barrow can be used as a platform-barrow simply by removing the side and end-boards.

Having thus described my invention, its construction and operation, what I claim, and desire to secure by Letters Patent of the United States, is—

A wheel-barrow, composed of the above-described parts, all arranged, constructed, and operating in the manner above set forth and shown.

FRANCIS PARKERSON.

Witnesses:
CHARLES H. EVANS,
ISAAC R. OAKFORD.